July 18, 1944.    J. G. FORD ET AL    2,354,110
RESINOUS MATERIAL EMBODYING GLASS FIBERS
Filed Aug. 23, 1941
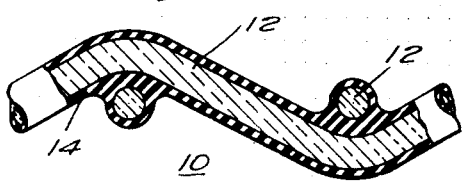
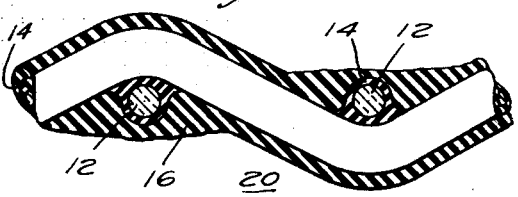
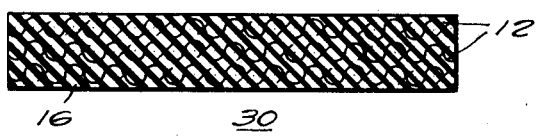
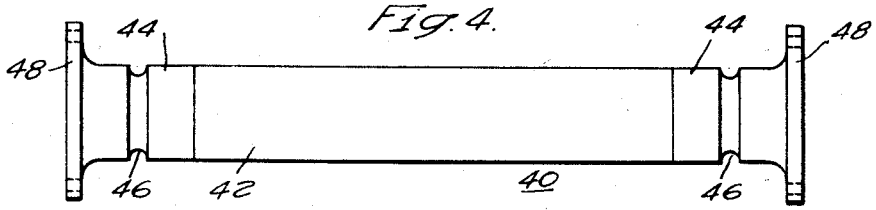
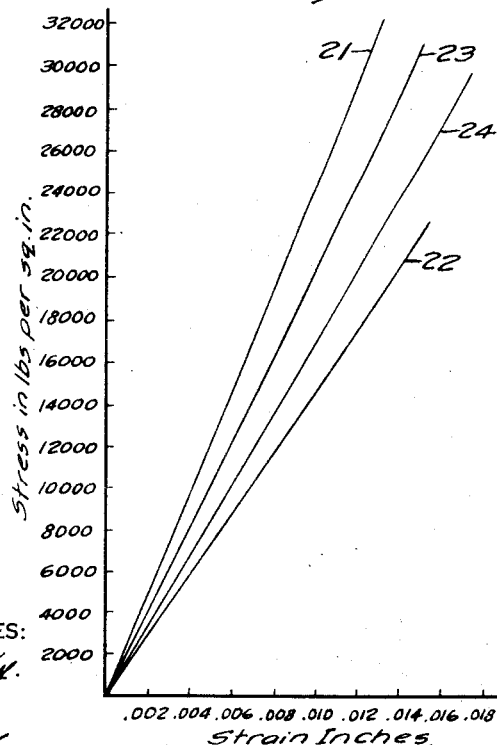
WITNESSES:
INVENTORS
James G. Ford and
Roger D. Spencer.
BY
ATTORNEY Patented July 18, 1944

2,354,110

UNITED STATES PATENT OFFICE 2,354,110

RESINOUS MATERIAL EMBODYING GLASS FIBERS

James G. Ford, Sharon, and Roger D. Spencer, Irwin, Pa., assignors to Westinghouse Electric & Manufacturing Company, East Pittsburgh, Pa., a corporation of Pennsylvania Application August 23, 1941, Serial No. 408,126

6 Claims. (Cl. 117—76)

This invention relates to molded synthetic resins and, more particularly, synthetic resins embodying glass fibers. This invention relates to a thermosetting resin of the phenol-aldehyde type embodying a distribution of glass fibers to impart great strength thereto and to provide for enhanced electrical and mechanical characteristics.

The object of this invention is to provide for embodying glass fibers in phenol-aldehyde type resins.

Another object of the invention is to provide for bonding phenol-aldehyde type resins to glass fibers in a manner to give the resulting composite material capacity to distribute applied stresses substantially evenly throughout the body.

A further object of the invention is to provide for a composite material prepared from phenol-aldehyde type resins and glass fibers having substantially linear stress-strain characteristics.

Other objects of the invention will, in part, be obvious and will, in part, appear hereinafter.

For a fuller understanding of the nature and objects of the invention, reference may be had to the following detailed description taken in conjunction with the accompanying drawing, in which:

Figure 1 is an enlarged fragmentary view, partly in section of precoated glass fibers;

Fig. 2 is an enlarged fragmentary view partly in section of precoated glass fabric impregnated with phenolic resin;

Fig. 3 is a sectional view of a composite member;

Fig. 4 is a plan view of a member embodying the composite member of Fig. 3; and

Fig. 5 is a graph of the stress-strain characteristics of samples of the composition prepared according to the invention.

Heretofore, it has been appreciated that glass fibers prepared from filaments of glass of an average diameter of 0.00025 or finer have high tensile strength characteristics. In view of the inorganic nature of the glass fibers whereby the fibers withstand high temperature and their resistance to most acids, alkalies, and solvents, it has been deemed desirable to incorporate such glass fibers into resinous materials to impart strength thereto even at elevated temperatures as well as to produce improved chemical resistance. However, when such fibers have been embodied in resinous material, particularly in thermosetting type of synthetic resins, such as phenolaldehydes, the strength of the composite material has been unexpectedly low. It is possible to attain greater tensile strength by incorporating cotton cloth, duck and other known organic fillers into phenolic resins. Furthermore when a composite material of phenol aldehyde resin and glass fibers has been employed in service with strong chemicals, such as acids or alkalis, the material failed even more rapidly in many cases than with the presumably weaker organic reinforcing fillers, such as cotton duck, heretofore used.

It has been discovered that the reason for the poor tensile strength of composite materials composed of phenolic resin and glass fibers as a reinforcing filler is primarily due to the fact that there is only a weak bond between the phenolic resin and the glass fibers. Glass filaments have extremely smooth surfaces to which the resin fails to bond mechanically. Second, when composite glass fiber phenolic resin is subjected to stresses, the glass fibers are not stressed uniformly. Instead, the stress apparently is imposed upon a few glass fibers at any one time, and consequently, these fibers are broken before other fibers take up the stress. Accordingly, glass fibers have not shown much promise as a reinforcing filler for resins due to the nature of the combination.

In addition the lack of chemical resistance in a phenol-aldehyde composite material reinforced with glass fibers is believed to be due to the fact that not only is there no substantial bond between the resin and the glass fibers to prevent the inter-penetration of chemicals, but, also the lack of chemical resistance may be traced to the fact that glass fibers are spun from filaments which carry a coating of starch or oil to facilitate spinning and weaving. While this coating of starch or oil is relatively minute, under the action of acids, for example, at the exposed fiber ends at the surface of the composite material, the oil or starch is rapidly removed and a pathway is provided for the penetration of the acid by capillary action and otherwise through the entire thickness of the material. In this manner the action of the chemicals is exerted upon a surface that is many times greater than that of the normal exterior surface of the molded composite material. When the fibers are deprived of the coating of starch or oil by the action of the strong chemicals, for example, in rayon spinning buckets, the bare fibers begin to abrade each other under applied centrifugal stresses, and due to the relatively great frictional forces developed, the fibers are rapidly cut and disintegrated. Accordingly, failure of the apparatus occurs within a relatively short time in this type of service.

According to this invention, glass fibers are incorporated in a phenol-aldehyde type resin to produce a remarkably strong composite material having novel properties which render the material suitable for electrical, chemical, and mechanical service of the most severe type. In tests with such material, the service requirements have been met exceedingly satisfactorily.

In embodying glass fibers in thermosetting resins, the fibers may be employed either woven into fabric or knitted, braided or felted or as a distribution of fibers heterogeneously distributed in the resin. For applications in which tensile strength characteristics are not predominating, relatively cheaper staple glass filaments each of a few inches in length may be employed in preference to continuous filament material. For applications calling for high tensile strength, glass threads formed from continuous filaments of a diameter of finer than 0.002 inch are preferred. It has been discovered that staple glass filaments spun into threads do not have the tensile strength of a similar fiber produced from continuous filaments. These threads are customarily made from 102 fine filaments of glass. However, depending upon manufacturing procedure, the number of filaments per thread may vary from this number.

Preparatory to embodying the glass fibers in the phenolic resins, particularly for chemical and electrical purposes, the starch or oil present thereon is removed. The starch or oil, which is present for enhanced spinning and weaving characteristics, may be removed by washing in suitable reagents or solvents capable of removing the surface coatings.

In order to obtain a good bond of the phenol-aldehyde type resin, for example, to the glass fibers, the glass fibers are precoated with a resinous material capable of adhering to the glass fibers, either with or without the starch and oil coating normally present thereon. In the copending application of R. W. Auxier, Serial No. 400,038, filed June 27, 1941, and assigned to the same assignee as this application, there is disclosed the application of an oil modified phenol-aldehyde type resin which it has been discovered has the characteristics of adhering tenaciously to glass fibers, the oil modified resin being further capable of bonding to the main body of phenol-aldehyde type resin. According to the invention in the present specification, the glass fibers are coated with a modified polyvinyl ester. Such modified polyvinyl esters are characterized by tenacious adherence to the glass fibers and good bonding to phenol-aldehyde type resins. Furthermore, the polyvinyl esters have a desirable degree of elasticity which permits distribution of applied strains substantially evenly to the reinforcing glass fibers without injurious overstressing of a small portion of the fibers. Furthermore, the modified polyvinyl esters seal the bundle of filaments forming each thread against the penetration of moisture. The polyvinyl esters are chemically resistant to acids and alkalis to a high degree.

The reaction products of the partially hydrolyzed polyvinyl acetate and various aldehydes, are examples of the modified polyvinyl esters contemplated which will produce satisfactory precoating layers upon the glass filaments. More particularly, such modified polyvinyls are produced by condensing formaldehyde, acetaldehyde, propionic aldehyde, butyric aldehyde, and the like, with a partially or completely hydrolyzed polyvinyl ester, such as polyvinyl acetate, polyvinyl propionate, polyvinyl butyrate, and the like. This reaction product of a polyvinyl ester with an aldehyde is commonly designated as polyvinylal resin. It has been found that polyvinyl butyral produces excellent results when applied to fiber glass as a precoating prior to applying phenol-aldehyde resins.

Since the function of the precoating requires elasticity to distribute stresses substantially evenly to the glass fibers embodied in thermosetting resins, it is advantageous in many instances to incorporate plasticizers in the modified polyvinyl ester. Dibutyl phthalate, tricresyl phosphate, diamyl phthalate, triacetin, and butyl tartrate are plasticizers suitable for plasticizing polyvinylal resins. Other plasticizers suitable for polyvinylals are known to the art and need not be enumerated extensively. Up to 50% plasticizer may be added—the larger portions of plasticizer producing softer and more elastic coatings.

The modified polyvinyl ester is preferably applied to the threads of glass in a solution, for example, dissolved in toluene, coal tar naptha, xylene, and other solvents. The glass fibers, for example, in the form of woven glass cloth may be impregnated with the solution and the solvent evaporated by drying the cloth in ovens or exposing the cloth to infra-red heating lamps.

Referring to Fig. 1 of the drawing, there is shown a greatly magnified fragment of precoated glass cloth 10. The glass fibers 12 after being subjected to the resin impregnation and dried carry a thin layer 14 of the polyvinylal resin both on the surface of the thread and upon and between glass filaments. The quantity of precoating present on the glass fibers may range from 3% of the weight of the glass cloth to as much as 30% or even higher. The quantity of polyvinylal resin will depend upon the degree of elasticity desired and the requirements of the use to which the material will be put.

The precoated glass fibers are subsequently impregnated with a predetermined quantity of thermosetting resin, such as a phenol-aldehyde, for example, a cresylic acid-formaldehyde resinous condensate. Generally, the amount of the phenol-aldehyde resin will exceed the quantity of polyvinyl ester precoating. For example, the precoating may constitute 14% of the weight of the glass fibers, and sufficient cresylic acid formaldehyde may be applied to increase the total resin content to equal 90% of the weight of the glass fibers. The amount and character of phenolic resin will depend upon the strength and other characteristics desired. Large quantities of resin may be applied to the cloth by a plurality of impregnations in a phenol-aldehyde solution with subsequent drying between each successive application. A composite member having a high phenol resin content will have a strength less than that of a similar size composite member produced from a plurality of layers of glass cloth impregnated with less resin. The resin is applied to the precoated fiber in the A stage, and when dried on the glass fibers is converted to the B stage.

Referring to Fig. 2 there is shown an impregnated sheet of glass cloth 20 consisting of glass threads 12, a polyvinyl resin precoating 14 surrounding and adhering to the threads 14 and a larger quantity of phenolic resin 16 in the B stage.

A plurality of members 20 may be superimposed upon each other in a predetermined amount and shape, and when subjected to pressure and temperature, the phenolic resin 16 in the B stage will flow and finally assume an insoluble state or the C stage. Referring to Fig. 3 of the drawing, there is illustrated in cross-section a composite member 30 produced by such a process consisting of a plurality of layers of glass cloth 12 embedded in phenolic resin body 16. The glass fibers of the laminations of cloth 12 of Fig. 3 each carries a precoating of polyvinyl ester derivative applied as herein disclosed. Pressures from 1000 to 3000 pounds per square inch and temperatures of 150° C. to 190° C. are suitable for molding the laminations.

By varying the amount of the precoating layer 12 on the glass fibers and the chemical composition of the precoating and the amount of plasticizing material incorporated therein, the strength and elasticity of the material may be varied to suit the requirements. Also, by suitable changes in the quantity of the thermosetting resin 16 applied to the precoated glass cloth, a wide range of properties may be secured in the molded member, such as 30 of Fig. 3. The member 30 may be relatively hard and somewhat brittle to meet certain service requirements, or it may be made relatively flexible with a wide range in tensile strength properties.

Referring to Fig. 4 of the drawing, there is illustrated a particular industrial application for a composite glass fiber phenol resin member employed as a tie rod for clamping stacks of arc-extinguishing laminations used in high capacity and high-voltage circuit breakers. The interruption of heavy currents when acting upon the arc-extinguishing laminations develops an interlamination gas pressure that is relatively enormous. It is required that the stacks be held together by a dielectric tie rod member having great strength. Furthermore, the size of the holding member is limited owing to the functioning characteristics of the apparatus.

The tie rod member of Fig. 4 was developed from a phenol-aldehyde resin embodying glass fibers according to the present invention to meet this requirement. The main body of the tie rod 40 consists of a molded or turned round rod 42 embodying glass fibers in the thermosetting resin. Its length is over one foot, and the diameter is approximately one and one-half inches. At each end of the rod 42 are steel ferrules 44 securely attached by spinning portions of the ferrules 44 at 46 into matching grooves in the rod 42. A number of such grooves may be employed at either end of the rod. The flanges 48 provide for restraining the arc-splitting laminations from separating.

The tie rods 40 have been subjected to severe electrical and mechanical tests with satisfactory results. For example, a composite rod 42 withstood a voltage for a distance of 13¼ inches between steel ferrules 44 applied in an impulse test of 1½–40 microsecond wave at 1,180,000 volts. This represented the capacity of the testing apparatus. With 60-cycle current, the same tie-rod member withstood 420,000 volts at 60 cycles. No failure of the rods on the electrical tests occurred.

Glass fibers of the continuous filament type precoated with polyvinyl butyraldehyde resin when bonded with cresylic acid formaldehyde resin have shown extraordinary tensile strength characteristics. Referring to Fig. 5 of the drawing, there is illustrated the stress-strain curves 21, 22, 23 and 24 of four different samples of material prepared according to this invention. It will be noted that contrary to all previous experience with synthetic resins, the stress-strain curves are substantially straight lines. There is no noticeable plastic flow in any of the samples tested. Each of the curves is a plot of a plurality of points which fell very closely along the lines drawn. There was no observable disproportionate increase in strain with increased stress as is typical of resinous materials when tested in tension. The end points of each of the curves drawn represent the ultimate tensile strength. It is believed that the production of composite laminated members having the tensile strengths shown in the curves is a significant step forward in the art of thermosetting resins. In fact, no resin is known that will give similar tensile strengths, particularly comparable with those obtained from samples corresponding to curves 21, 23 and 24. The material may be loaded and released in continuous cycles without plastic flow, since the straight lines indicate that the material follows Hooke's law.

Composite glass-cloth phenol-aldehyde material of the type disclosed and tested is highly desirable for many engineering applications. Airplane members requiring great strength, such as propellers, centrifugal apparatus such as rayon spinning buckets and members subjected to tension in various apparatus, particularly electrical apparatus, may be constructed of the material with significant reduction in the weight of the apparatus. Numerous other types of structural applications will be obvious to those skilled in the art. It is believed that samples corresponding to those having strengths as in curves 21, 23 and 24 on a weight-to-weight ratio have the greatest tensile strength of most known engineering materials based on their density which is approximately 27 grams per cubic inch.

Impact tests of the material have disclosed that the shock resistance is high. It is believed that the introduction of the elastic layer between the fiber glass material and the main body of the phenolic resin imparts unexpected improvements in shock resistance. A bar of 1½ inches diameter similar to that shown in Fig. 4 was subjected to numerous impacts of 120 foot pounds each. There was no observable failure or cracking of the material after many blows. Samples subjected to the standard Charpy test gave values of 21½ foot pounds and higher when tested both flatwise and edgewise to the laminations of glass cloth.

An objectional feature of prior art composite material molded from sheets of cloth of various materials has been the lack of adequate bonding strength between laminations. The bond strength of phenol-aldehyde resins embodying glass cloth coated with polyvinylal resins when tested on laminations of a size of ½ inch by 1 inch ranged from 960 pounds to 1840 pounds on representative samples. It will be evident that the material fulfills the requirements of adequate bond strength to a high degree.

The precoating on the glass fibers accomplishes the function of reducing water absorption which would be harmful when the composite material is employed for electrical insulation.

While it is contemplated that phenol-aldehyde type resins will produce the best composite material, the phenol-aldehyde resins may be modified with other substances, such, for example, as tung oil. Other thermosetting resins may be incorporated with phenol-aldehyde resin in order to impart predetermined properties. Urea formaldehyde resin is an example of such modifying material.

Since certain changes may be made in the above article, and different embodiments can be made without departing from the scope thereof, it is intended that all matter contained in the above description or shown in the accompanying drawing shall be interpreted as illustrative and not in a limiting sense.

We claim as our invention:

1. A composite material comprising, in combination, a heat treated, thermosetting phenol-aldehyde resin, a plurality of glass fibers distributed in the phenol-aldehyde type resin, and a tenaciously adherent coating of a thermoplastic reaction product of polyvinyl acetate and an aldehyde on the glass fibers, the coating providing for a good bond of the phenol-aldehyde type resin to the glass fibers and the thermoplastic coating permitting relative glass fiber movement whereby high strength in the composite material is obtained.

2. A composite member comprising, in combination, a body of heat-treated thermosetting phenol-aldehyde resin, a plurality of substantially continuous filament glass fibers distributed in the resin body, and a coating of the reaction product of polyvinyl ester and an aldehyde applied to the glass fibers to provide for an elastic bond between the phenol-aldehyde type resin and the glass fibers, and to distribute stresses applied to the member substantially evenly.

3. A composite member having good dielectric properties comprising in combination, a body of a relatively infusible, phenol-aldehyde resin, a distribution of glass fibers in the resin body, the glass fibers consisting of substantially continuous filaments of glass of an average diameter of 0.00025 inches, and a coating of the reaction product of polyvinyl ester and an aldehyde on the glass fibers, the coating bonding to the fibers and serving to seal the fibers against moisture penetration along the surface of the filaments, the coating bonding to the phenol-aldehyde resin body to provide for a good bond strength, the coating on the glass fibers being elastic to distribute applied stresses to the glass fibers whereby high strength in the member is produced.

4. A composite member having good dielectric properties comprising in combination, a body of a relatively infusible, phenol-aldehyde resin, a distribution of glass fibers in the resin body, the glass fibers consisting of substantially continuous filaments of glass of an average diameter of 0.00025 inches, and a coating of a polyvinyl aldehyde resin including a plasticizer to impart a predetermined degree of elasticity to the coating on the glass fibers, the coating bonding to the fibers and serving to seal the fibers against moisture penetration along the surface of the filaments, the coating bonding to the phenol-aldehyde resin body to provide for a good bond strength, the coating on the glass fibers being elastic to distribute applied stresses to the glass fibers whereby high strength in the member is produced.

5. A composite material comprising, in combination, a heat-treated thermoset phenolic and a reinforcing filler, the filler composed of substantially continuous strands of glass fiber, a coating of the reaction product of an aldehyde and a partially hydrolyzed polyvinyl ester, the coating having 5% to 50% of plasticizer to provide for elasticity, the coating applied to the glass fiber strands, the coating bonding to the thermoset phenolic resin to provide for a high bond strength and increased delamination resistance, the plasticized coating permitting relative movement of the glass fibers for stress distribution whereby high tensile strength in the composite material is secured.

6. An article of manufacture comprising, in combination, a woven glass fabric composed of filaments of glass finer than 0.002 inch in diameter, a precoating of a modified polyvinyl ester consisting of a polyvinylal resin applied to the glass fabric to provide for an elastic bonding layer and a superimposed coating of phenol aldehyde resinous condensate applied upon the precoated glass fibers.

JAMES G. FORD.
ROGER D. SPENCER.